UNITED STATES PATENT OFFICE.

EDWARD A. PATERSON, OF NORTH TONAWANDA, NEW YORK.

ROAD-MAKING COMPOSITION.

1,171,236.     Specification of Letters Patent.     Patented Feb. 8, 1916.

No Drawing.     Application filed June 20, 1914. Serial No. 846,402.

*To all whom it may concern:*

Be it known that I, EDWARD ALFRED PATERSON, a subject of the King of Great Britain, at present residing in North Tonawanda, in the county of Niagara and State of New York, have invented certain new and useful Improvements in Road-Making Compositions, of which the following is a specification.

My invention relates to roads and materials for making them of the general kind described in my U. S. Patent No. 1,042,474, of Oct. 29, 1912. In said patent I have described a road comprising in its construction a road metal, an alkaline silicate and carbonate of calcium, used in such proportions that when exposed to atmospheric carbonic acid the silicate is converted into silica in the presence of moisture, the sodium carbonate formed being washed away by rain or melted snow and the carbonate of calcium assisting in the reaction. The sodium silicate referred to in said patent was in a liquid form, or in a dry state, but not in the form of a hydrous alkali metal silicate, and I have found that results superior in economy and efficiency are obtained by using sodium silicate in a dry hydrous condition. There are many advantages incident to the use of sodium silicate in this form. First, it can be transported to the place of use very conveniently and can be dissolved *in situ* and there mixed with the other ingredients of the road, and furthermore a larger amount of silicate can be employed because the admixture may be made before the water is added or together with the water and thus a larger amount of silica obtained on the surface of the road. I have also found it sometimes advantageous to use asphaltum in a semi-liquid solution and prepared in such manner that it does not separate from the other ingredients when mixed with water.

While I have mentioned the use of calcium carbonate, or other equivalent carbonates of alkali earth metals all of which seem to aid in transferring the carbon dioxid from the atmosphere to the silicate of the alkali metal, thereby serving to break up such silicate and free the silica, I may use an equivalent thereof such as dolomite.

The methods employed for making roads of various kinds are, generally considered, the same as those described in my before-mentioned patent but the presence of asphaltum, which intimately mixes with the other ingredients and with water, assists in producing a mixture which firmly holds in place the road metal aggregate, sand or crushed stone and prevents the formation of dust.

The hydrous alkali metal silicate employed is prepared in the manner specified in my applications for U. S. Patent filed December 17, 1913, Serial No. 807,358, and June 20, 1914, Ser. No. 846,401. This material is dry and may be in a powdered form suitable for transportation.

I preferably employ calcium carbonate or lime rock although equivalents may be used, and I crush the lime rock to such an extent that it will pass through a screen of about ten holes to the square inch. When semi-liquid asphaltum is used it is prepared by dissolving rock asphaltum (Trinidad asphalt) or any suitable asphalt in crude petroleum oil with or without the addition of say 1% or 2% of nitrobenzol in a steam heated digester, only sufficient of the solvent being used to make a thick mixture which is just capable of flowing. I find that 50% crude petroleum oil to 50% to 60% asphalt gives a suitable mixture.

A matrix or binder is made from the three materials—that is, the crushed rock, the asphaltum solution and the hydrous silicate—thus prepared in the manner described in my patent above mentioned and it serves to cement and firmly bind and hold in place the road metal or aggregate which may be trap rock, granite, sand or fine rock screenings or hard stone of any suitable kind ordinarily used in road making.

In constructing a road I preferably proceed as follows: The powdered lime stone or calcium carbonate is mixed with from 2% to 5% of hydrous alkali metal silicate in an ordinary concrete mixer with about 15% to 20% of water. After the lime and silicate are thus treated in the mixer and assume a granular condition free from lumps, the semi-liquid asphaltum, when used, is added in the proper proportions best suited to the object in view, but generally 2% to 5% of the asphaltum is employed, the object being to provide a good matrix for road making. After this the lime stone, silicate and asphaltum are well mixed until a thick paste is formed, and when this is accomplished the binding material so produced is spread on a suitably prepared road bed in such manner as to form a layer or road surface or covering of from one inch to two inches thick or of any other desired thickness to produce the desired matrix. The aggregate or road metal is next suitably spread on the matrix and is forced into it by a steam roller in such manner that the road metal will be forced down into the matrix and the binding material will rise and fill the interstices between the pieces of road metal and will produce a hard surface which is comparatively dustless and water proof. I may mix together in the mixer all of the materials employed for making the road covering and afterward spread the mixture on the road bed and roll it. Such is preferably the case where sand or rock screenings are used. The carbon dioxid of the atmosphere or carbon dioxid supplied in any other way as by a spray of carbonated water acts on the silicate in the manner described in my before-mentioned patent, converting the silicate into sodium carbonate, silica and water. The sodium carbonate is easily washed away, leaving the hard, durable and insoluble silica, the asphaltum remains unchanged and assists in the binding action and in rendering the road comparatively dustless and water proof, while the calcium carbonate is useful because in its presence a freer interchange of atoms occurs between the sodium silicate and the carbon dioxid, and under humid conditions the calcium carbonate assists in throwing off the sodium carbonate and the contained water in the sodium silicate, which as before stated is used in a hydrated form best suited for the reaction specified.

It will be understood that the reactions do not take place until the mixture is exposed to carbon dioxid either atmospheric or specially supplied and that such portion of the mixture in the matrix as is not exposed remains substantially unchanged except that the silicate becomes dehydrated by contact with the carbonate.

It will be understood that where in the claims I specify calcium carbonate and hydrous sodium silicate I include their chemical equivalents.

I claim as my invention:—

1. A road covering, comprising essentially a road metal, powdered calcium carbonate and a soluble alkali metal silicate containing a large percentage of silica and a relatively small percentage of combined water.

2. A road covering, comprising essentially a road metal, powdered calcium carbonate, asphaltum and a soluble alkali metal silicate containing a large percentage of silica and a relatively small percentage of combined water.

In testimony whereof, I have hereunto subscribed my name.

EDWARD A. PATERSON.

Witnesses:
  LLOYD B. WIGHT,
  E. B. FRANZONI.